United States Patent
Tomita (10) Patent No.: US 8,346,018 B2
(45) Date of Patent: Jan. 1, 2013

(54) HOT FOLDER DETERMINING ROTATION ANGLE OF IMAGE

(75) Inventor: Makoto Tomita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 11/683,183

(22) Filed: Mar. 7, 2007

(65) Prior Publication Data

US 2007/0273933 A1 Nov. 29, 2007

(30) Foreign Application Priority Data

Mar. 31, 2006 (JP) .................................. 2006-096903
Dec. 5, 2006 (JP) .................................. 2006-328507

(51) Int. Cl.
*G06K 9/36* (2006.01)
*G06F 3/12* (2006.01)

(52) U.S. Cl. ........ 382/289; 362/276; 358/1.1; 358/1.15; 358/448

(58) Field of Classification Search .................. 355/133; 358/1.1, 448, 449, 451, 452, 474; 382/276, 382/287, 289–298
See application file for complete search history.

(56) References Cited

U.S. PATENT DOCUMENTS

| | | | | |
|---|---|---|---|---|
| 5,508,810 A | * | 4/1996 | Sato | 358/296 |
| 6,069,983 A | * | 5/2000 | Otaki | 382/296 |
| 6,271,929 B1 | * | 8/2001 | Zhao | 358/1.18 |
| 6,961,139 B1 | * | 11/2005 | Kita et al. | 358/1.15 |
| 2002/0143850 A1 | * | 10/2002 | Caronni et al. | 709/201 |
| 2003/0014493 A1 | * | 1/2003 | Sakurai et al. | 709/206 |
| 2003/0202191 A1 | * | 10/2003 | Osawa et al. | 358/1.1 |
| 2004/0246967 A1 | * | 12/2004 | Killermann | 370/395.2 |
| 2005/0073695 A1 | * | 4/2005 | Nacman et al. | 358/1.2 |
| 2005/0275863 A1 | * | 12/2005 | Ota | 358/1.13 |

FOREIGN PATENT DOCUMENTS

| | | |
|---|---|---|
| JP | 04-150142 A | 5/1992 |
| JP | 05-136920 A | 6/1993 |
| JP | 08-139885 A | 5/1996 |
| JP | 10-065905 A | 3/1998 |
| JP | 10-290338 A | 10/1998 |
| JP | 2004-312103 A | 11/2004 |
| WO | WO 2004/093431 A1 * | 10/2004 |

OTHER PUBLICATIONS

Translation of International Patent Application Publication No. WO 2004-093431 A1 to Harada et al.*

* cited by examiner

*Primary Examiner* — Benny Q Tieu
*Assistant Examiner* — Eric A Rust
(74) *Attorney, Agent, or Firm* — Canon USA, Inc., IP Division (57) ABSTRACT

An image processing apparatus obtains registration information associated with an information processing apparatus at a transmission destination to which an image read by an image reader is to be transmitted. Based on the registration information, the image processing apparatus determines whether the information processing apparatus requires executing image rotation at the image processing apparatus.

6 Claims, 10 Drawing Sheets

FIG. 3

REGISTRATION INFORMATION 1

| REGISTRATION NAME: DESTINATION 1 |
|---|
| RESOLUTION: 600 dpi |
| READING TYPE: SINGLE-SIDED |
| TRANSMISSION FORMAT: TIFF/JPEG |
| TRANSMISSION PROTOCOL: FTP |
| TRANSMISSION DESTINATION: 192.168.0.1 |
| TRANSMISSION WITHOUT ROTATION: ALLOWED |

REGISTRATION INFORMATION 2

| REGISTRATION NAME: DESTINATION 2 |
|---|
| RESOLUTION: 600 dpi |
| READING TYPE: DOUBLE-SIDED |
| TRANSMISSION FORMAT: TIFF/JPEG |
| TRANSMISSION PROTOCOL: FTP |
| TRANSMISSION DESTINATION: 192.168.0.1 |
| TRANSMISSION WITHOUT ROTATION: ALLOWED |

| NUMBER OF PAGES |
| --- |
| IMAGE FILE NAME |
| READ SETTING (SINGLE-SIDED/DOUBLE-SIDED) |
| OPENING DIRECTION |
| READING DIRECTION |

| Device authentication | | |
|---|---|---|
| Device IP address | 172.22.22.22 | ~1001 |
| System administration department ID | 12345 | ~1002 |
| System administration password | ****** | ~1003 |
| | OK    Cancel | |

FIG. 11

| Setting details | | |
|---|---|---|
| Button number | 2 ▼ | ~1101 |
| Button name | My PC | ~1102 |
| Read setting | Black 200 dpi ▼ | ~1103 |
| Single-sided/Double-sided | Single-sided ▼ | ~1104 |
| File format | TIFF ▼ | ~1105 |
| Protocol | FTP ▼ | ~1106 |
| | OK    Cancel | |

HOT FOLDER DETERMINING ROTATION ANGLE OF IMAGE

BACKGROUND OF THE INVENTION

1. Field of the Invention

The present invention relates to image processing apparatuses, information processing apparatuses, image processing methods, and information processing methods.

2. Description of the Related Art

Generally, when an image is read by a document reader, the orientation of the acquired image depends on a reading direction, which is determined by the physical mechanism of the document reader. Thus, in order to obtain an image placed in an upright orientation, an acquired image has to be rotated to an upright orientation in consideration of various parameters relating to the reading direction, such as the orientation of placement of an original document, setting of the opening direction of the original document, and whether the original document is fed from an automatic document feeder (ADF) or the document is placed and read on an image reader plate. It has hitherto been the case to execute the rotation at an image processing apparatus including a document reader, so that an application that uses the image read by the document reader need not consider the orientation of the image.

Unfortunately, however, the processing ability of a document reader is usually lower than that of an ordinary personal computer (PC) due to cost restrictions. Thus, it may take a considerable processing time to rotate an image at the document reader, increasing the time required to finish image transmission. In view of the recent increase in the demand for reading a large number of sheets of original document and converting the original document into electronic form, such as data entry for a print-on-demand (POD) service, work efficiency could be reduced if it takes a considerable time to execute processing for image transmission from the image processing apparatus to the PC.

As another approach, for example, according to techniques disclosed in Japanese Patent Laid-Open No. 4-150142, instead of rotating an image at a document reader, at a recipient apparatus having received the image, a user specifies a manner of rotation on a display at the recipient apparatus so that a rotated version of the image is displayed.

As yet another approach, for example, according to techniques disclosed in Japanese Patent No. 3175550, an image read by a document reader is transmitted to a recipient apparatus together with information specifying a manner of image processing that is to be executed on the image, without limitation to rotation, so that the image is processed in the specified manner at the recipient apparatus.

As described above, when an image is rotated at an image processing apparatus, work efficiency could be reduced if it takes a considerable time to execute processing for image transmission from the image processing apparatus to a PC.

On the other hand, when an image is rotated at a recipient apparatus instead of rotating the image at an image processing apparatus, it is possible to reduce processing time associated with image rotation at the image processing apparatus. However, if the recipient apparatus is incapable of executing image rotation, the image cannot be rotated, so that it may not be possible to obtain an intended image orientation. In this case, when a user edits the image using an editing application running on the recipient apparatus, a user has to specify a direction of rotation and execute rotation on a page-by-page basis while visually checking the orientation of the image. This increases the user's workload.

As described above, there has not existed a mechanism that allows both quickly executing processing for transmission of an image read by an image forming apparatus to a recipient apparatus (e.g., a PC) and reduction of the load of user operations at the recipient apparatus.

SUMMARY OF THE INVENTION

Embodiments of the present invention provide a mechanism for allowing both quickly executing processing for transmission of an image read by an image forming apparatus to a recipient apparatus and reduction of the load of user operations at the recipient apparatus.

According to an aspect of the present invention, there is provided an image processing apparatus that is capable of transmitting an image read by an image reader in a form of a file. The image processing apparatus includes a selector configured to select an information processing apparatus at a transmission destination to which an image file including an image read by the image reader is to be transmitted; a determining unit configured to obtain registration information relating to the information processing apparatus at the transmission destination, and to determine based on the registration information whether the information processing apparatus requires executing image rotation at the image processing apparatus; and a transmission controller configured to transmit the image file to the information processing apparatus without rotating the image read by the image reader if it is determined by the determining unit that the information processing apparatus does not require executing image rotation at the image processing apparatus, the transmission controller configured to rotate the image read by the image reader and transmit the image file with the rotated image to the information processing apparatus if it is determined by the determining unit that the information processing apparatus requires executing image rotation at the image processing apparatus.

According to another aspect of the present invention, there is provided an information processing apparatus. The information processing apparatus includes a registration information generation unit configured to generate registration information including rotation-capability information indicating a capability of controlling image rotation; a transmitter configured to transmit the registration information to an image processing apparatus via a network; and an image receiver configured to receive an image read by the image processing apparatus from the image processing apparatus.

Further features of the present invention will become apparent from the following description of exemplary embodiments with reference to the attached drawings.

DESCRIPTION OF THE EMBODIMENTS

Now, embodiments of the present invention will be described with reference to the drawings.

Figure 1:
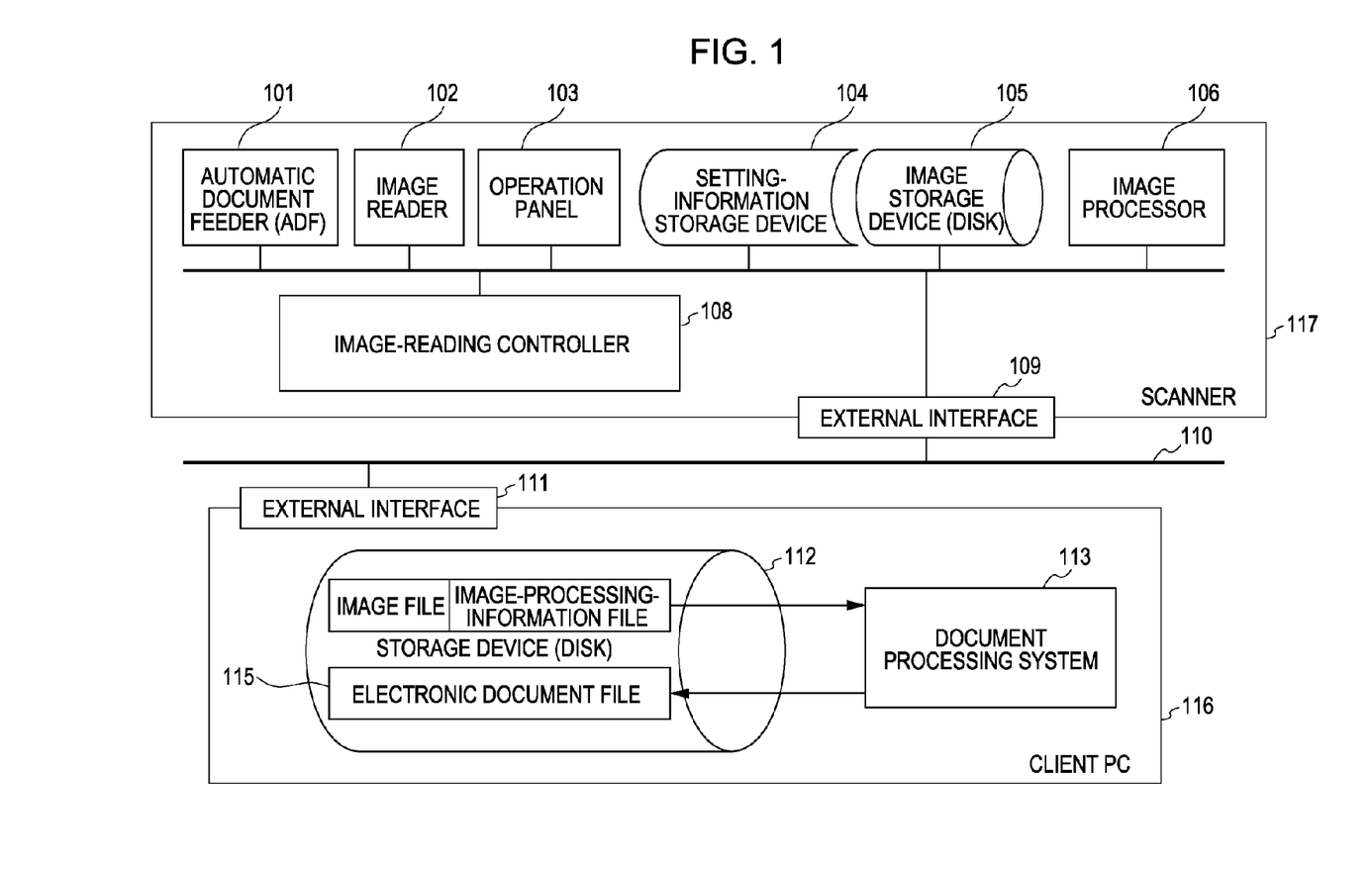
FIG. 1 is a diagram showing an example configuration of an image reading system.

FIG. 1 is a diagram showing the configuration of an image reading system, which is an image processing system according to an embodiment of the present invention. As shown in FIG. 1, the image reading system includes a scanner 117 and a client PC 116 connected to each other via a network 110. The scanner 117 is an image processing apparatus according to an embodiment of the present invention, and the client PC 116 is an information processing apparatus according to an embodiment of the present invention.

In the scanner 117, an image-reading controller 108 controls the operations of an automatic document feeder 101 and an image reader 102 according to a reading instruction issued by a user via an operation panel 103. The image-reading controller 108 stores an image read by the image reader 102 (image information) as it is in an image storage device 105.

Then, the image-reading controller 108 executes a determining process as needed with reference to transmission-destination information (relevant registration information or the like) stored in a setting-information storage device 104. Then, the image-reading controller 108 causes an image processor 106 to execute image processing on the image stored in the image storage device 105 to form a file of the image in PDF (Portable Document Format) or TIFF (Tagged Image File Format). The determining process will be described later in detail.

Then, the image-reading controller 108 transmits the image to a storage device 112 of the client PC 116 as a recipient via an external interface 109 of the scanner 117 and an external interface 111 of the client PC 116.

Figure 2:
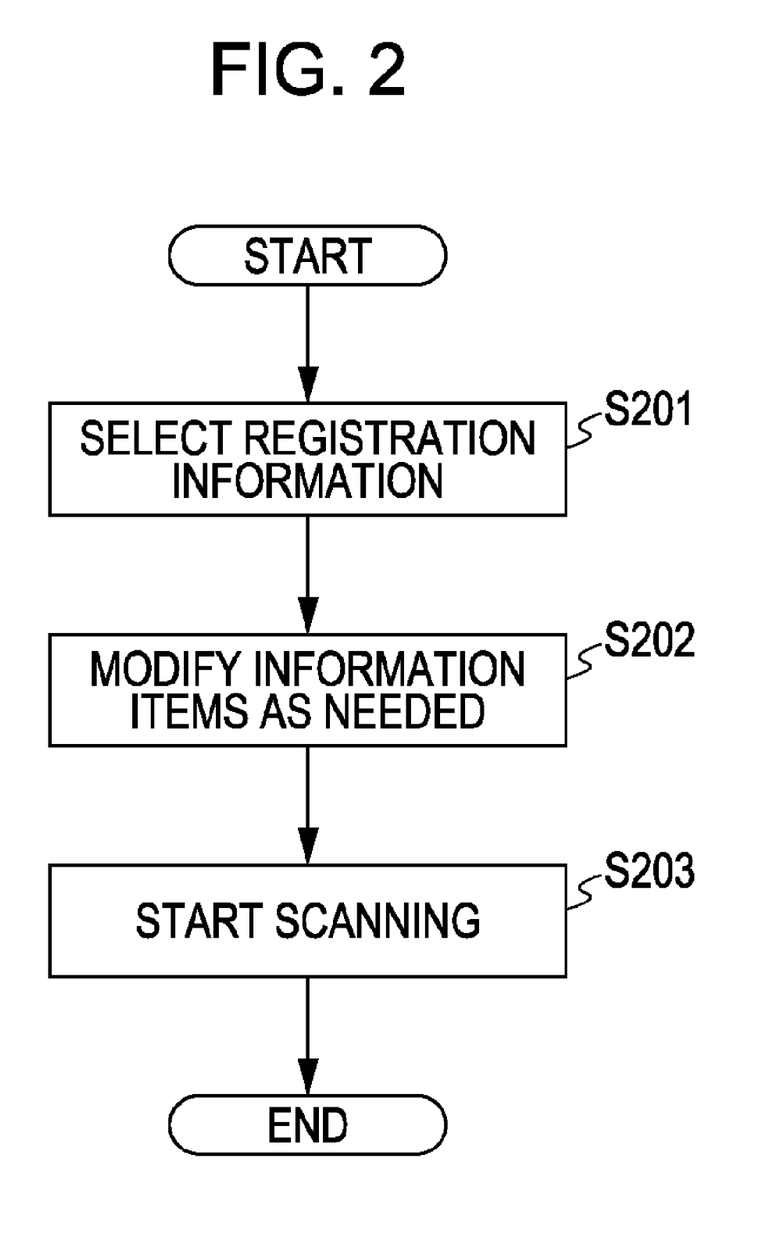
FIG. 2 is a flowchart showing an example of a process that is executed on the basis of operations of an operation panel.
Figure 13:
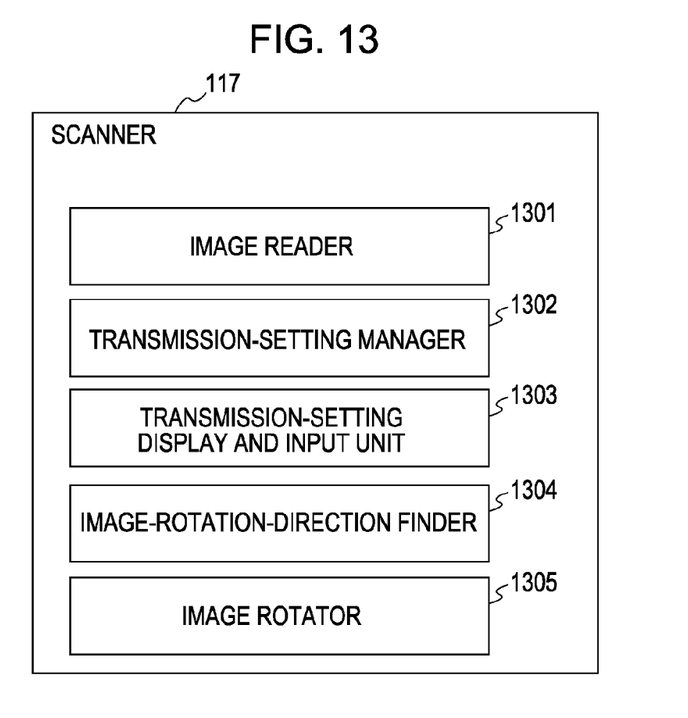
FIG. 13 is a block diagram schematically showing an example system configuration of a scanner.

Next, processes executed at the scanner 117 according to user's operations of the operation panel 103 will be described in detail with reference to FIGS. 2 and 13. FIG. 2 is a flowchart showing an example of a process executed at the scanner 117 according to user's operations of the operation panel 103. FIG. 13 is a block diagram schematically showing an example configuration of the scanner 117. FIG. 13 only shows functional components relevant to this embodiment, and other functional components are omitted.

Figure 9:
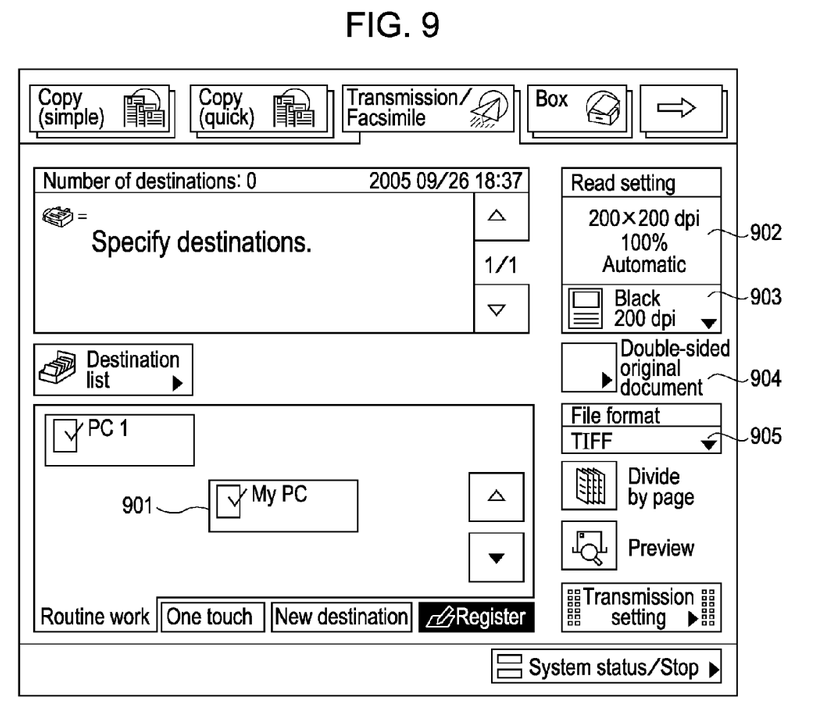
FIG. 9 is an illustration of an example of a UI displayed on an operation panel to allow operation.

A transmission-setting display and input unit 1303 displays an operation user interface (UI) or an operation screen on the operation panel 103, and waits for input or other operations by the user. FIG. 9 is an illustration of an example of an operation screen displayed on the operation panel 103.

Figure 3:
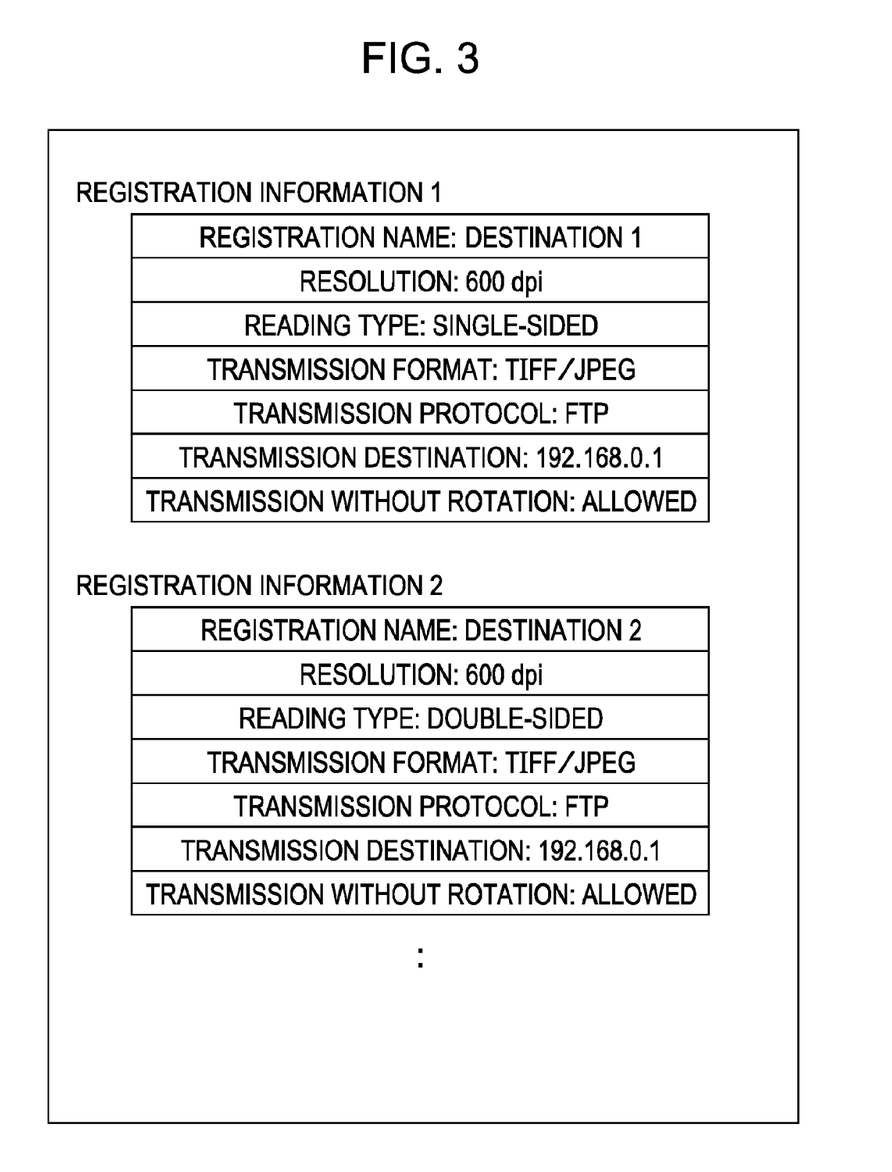
FIG. 3 is a diagram showing an example of routine registration information.

A transmission-setting manager 1302 (FIG. 13) manages setting of registration information including registration name, resolution, specification of single-sided/double-sided reading, transmission format, transmission protocol, transmission destination, and transmission-without-rotation permission information (rotation-capability information), as routine registration information. FIG. 3 is a diagram showing an example of routine registration information. A method of registering the routine registration information will be described later. The routine registration information is stored, for example, in the setting-information storage device 104.

In the operation screen shown in FIG. 9, for example, registration buttons (transmission-destination selecting buttons) 901 associated with individual sets of registration information shown in FIG. 3 are displayed. The scanner 117 selects specific registration information according to the user's selection of one of the registration buttons 901 (step S201).

The user operations setting buttons 902, 903, 904, and 905 in the operation screen are provided to set or change information of items in the selected registration information. The transmission-setting display and input unit 1303 or the transmission-setting manager 1302 sets or changes information of the items of the registration information selected in step S201, according to operations performed using the operation screen on the operation panel 103 (step S202). Then, the user performs an operation using the operation screen on the operation panel 103 to issue an instruction for starting a scanning operation. Upon receiving the instruction, the scanner 117 drives an image reader 1301 to start a scanning operation (step S203).

Figure 4:
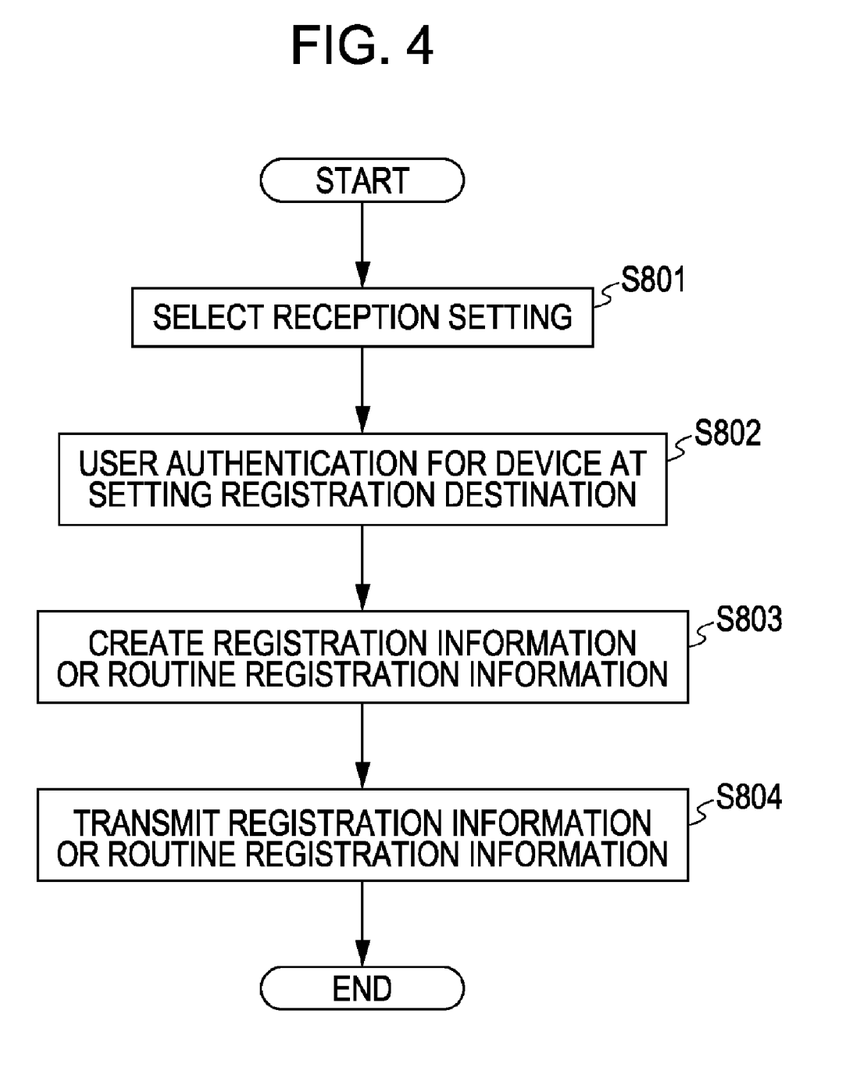
FIG. 4 is a flowchart showing an example of a process that is executed when a document processing system running on a client PC registers a routine task.
Figure 14:
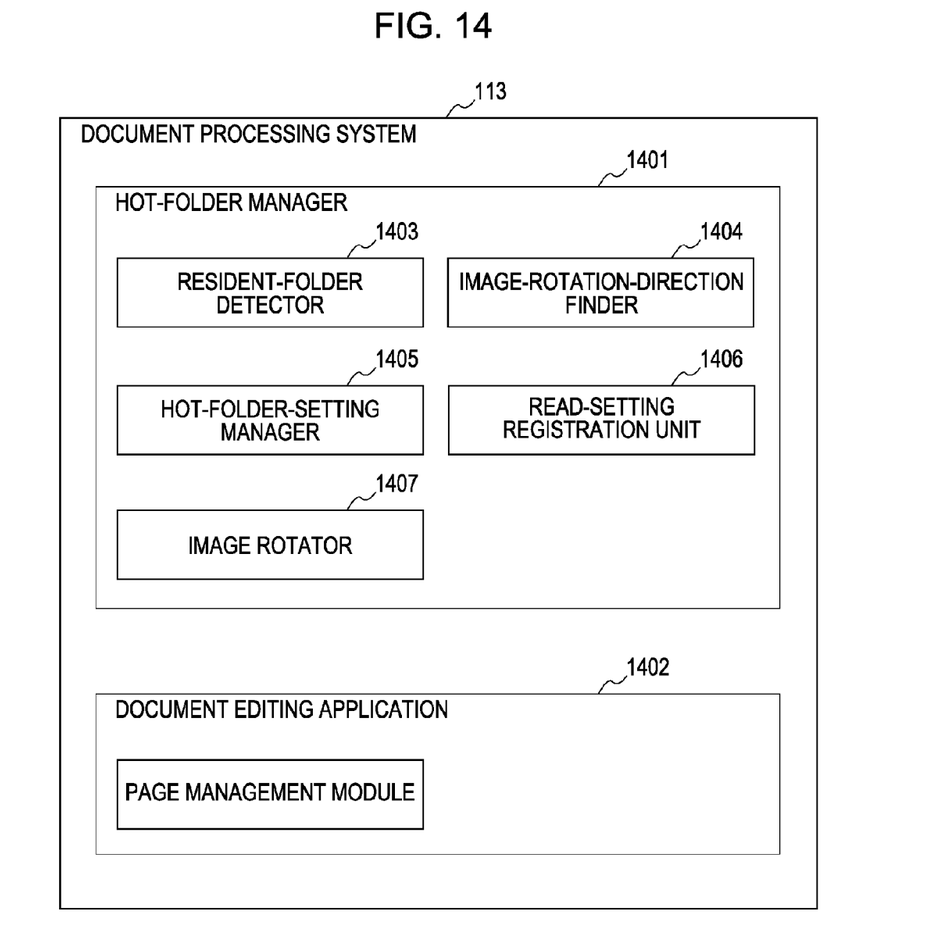
FIG. 14 is a block diagram schematically showing an example configuration of a document processing system running on a client PC.

FIG. 4 is a flowchart showing an example of a process that is executed when a document processing system running on the client PC 116 registers a routine task. It is assumed herein that the document processing system 113 allows defining a plurality of operations that can be executed on received data. As shown in FIG. 14, the document processing system 113 includes a resident-folder detector 1403 that detects input of a document or an image file to a specific folder referred to as a hot folder. The resident-folder detector 1403 allows detecting input of a file and automatically executing a specific operation. The specific operation that is automatically executed can be specified in advance by the user via a hot-folder-setting manager 1405.

The hot-folder-setting manager 1405 presents the user with a detail-setting property screen (FIG. 12) so that the user is allowed to specify an operation associated with the specific folder serving as a hot folder.

Figure 11:
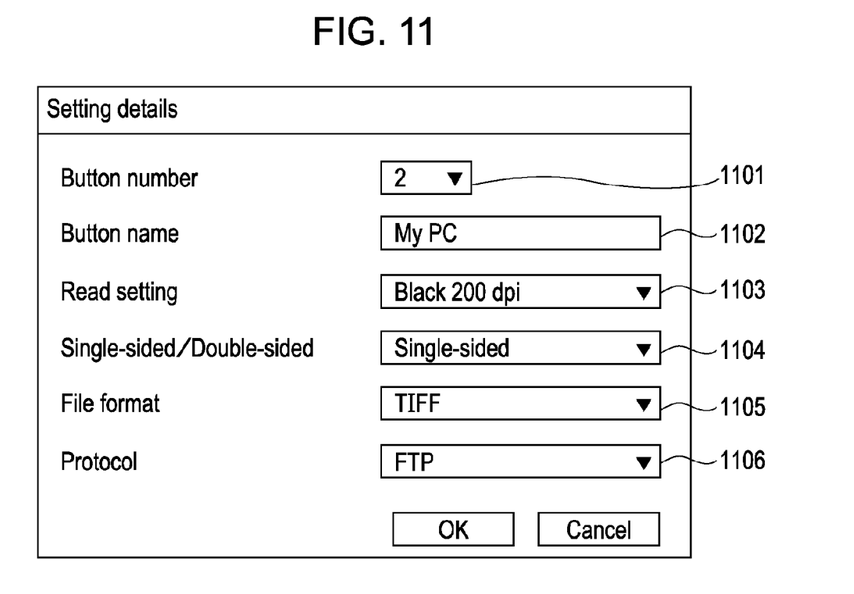
FIG. 11 is an illustration of an example of a screen for setting details when a document processing system running on a client PC registers a routine task.
Figure 12:
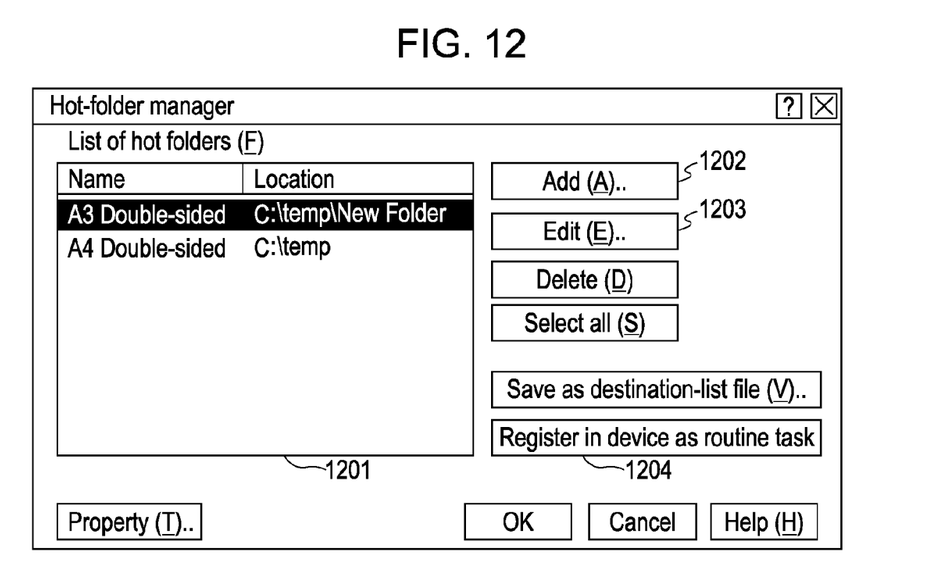
FIG. 12 is an illustration of an example of an operation screen that is displayed when a document processing system running on a client PC registers a routine task.

Furthermore, the user is also allowed to specify in advance setting for reading operations (1101-1106) by an image processing apparatus (the scanner 117 in this case) via a user interface for detail setting (FIG. 11), which is displayed when the user presses an edit button 1203 in the detail-setting property screen. The operation setting includes resolution, specification of single-sided/double-sided reading, transmission format, and transmission protocol. The operation setting is registered in the storage device 112 by a read-setting registration unit 1406.

Then, the document processing system 113 selects a reception setting that is to be registered in the scanner 117 among the reception settings that have been set, for example, according to user's operations or the like (step S801). For example, the procedure of the user's operations is as follows. When a setting is to be registered in the scanner 117, the user selects a specific folder that functions as a hot folder from a list 1201, or presses an add button 1202 to create a new setting.

Figure 10:
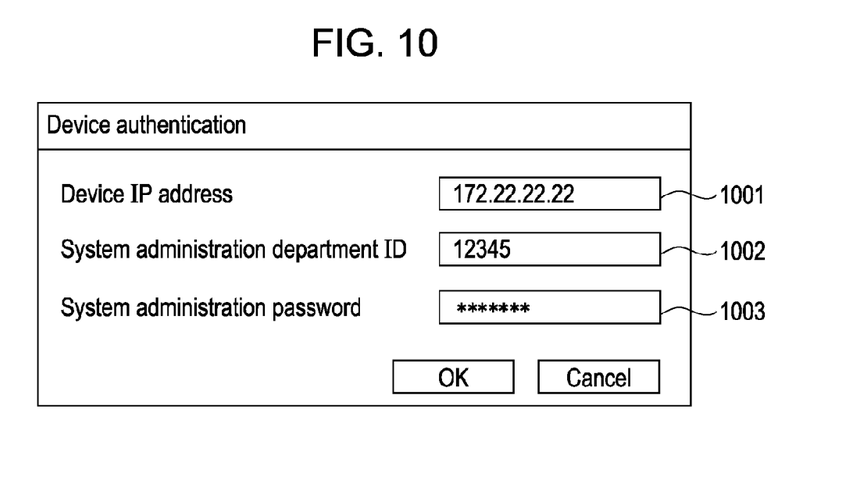
FIG. 10 is an illustration of an example of a screen for an authentication operation that is executed when a document processing system running on a client PC registers a routine task.

The user presses a registration button 1204 to register the reception setting in the scanner 117. Then, the read-setting registration unit 1406 executes user authentication to check whether the user is allowed to register setting in the scanner 117 (step S802). For example, the read-setting registration unit 1406 displays an authentication dialog shown in FIG. 10, and executes user authentication on the basis of items of authentication information 1001, 1002, and 1003 input by the user.

When the authentication has succeeded, the read-setting registration unit 1406 creates routine registration information from the setting for the specific folder specified by the user, i.e., resolution, specification of single-sided/double-sided reading, transmission format, and transmission protocol (creation of registration information) (step S803). Furthermore, in the routine registration information, the read-setting registration unit 1406 also includes address information of the client PC 116 itself, folder location information, and information indicating permission of transmission without rotation. Then, the read-setting registration unit 1406 transmits the routine registration information to the transmission-setting manager 1302 of the scanner 117 (transmission of registration-request information) (step S804).

Upon receiving the setting, in the scanner 117, the transmission-setting manager 1302 stores the routine registration information including the registration information received in the setting-information storage device 104 (reception of registration information). Then, in the scanner 117, according to the registration information stored in the setting-information storage device 104, the transmission-setting display and input unit 1303 displays candidate transmission destinations (the transmission-destination buttons 901) on the operation panel 103 (setting of transmission destination).

The user may further edit the registration information or routine registration information stored in the setting-information storage device 104 by performing operations using the operation panel 103, or create new registration information or routine registration information using the operation panel 103 and store the registration information or routine registration information in the setting-information storage device 104.

Figure 5:
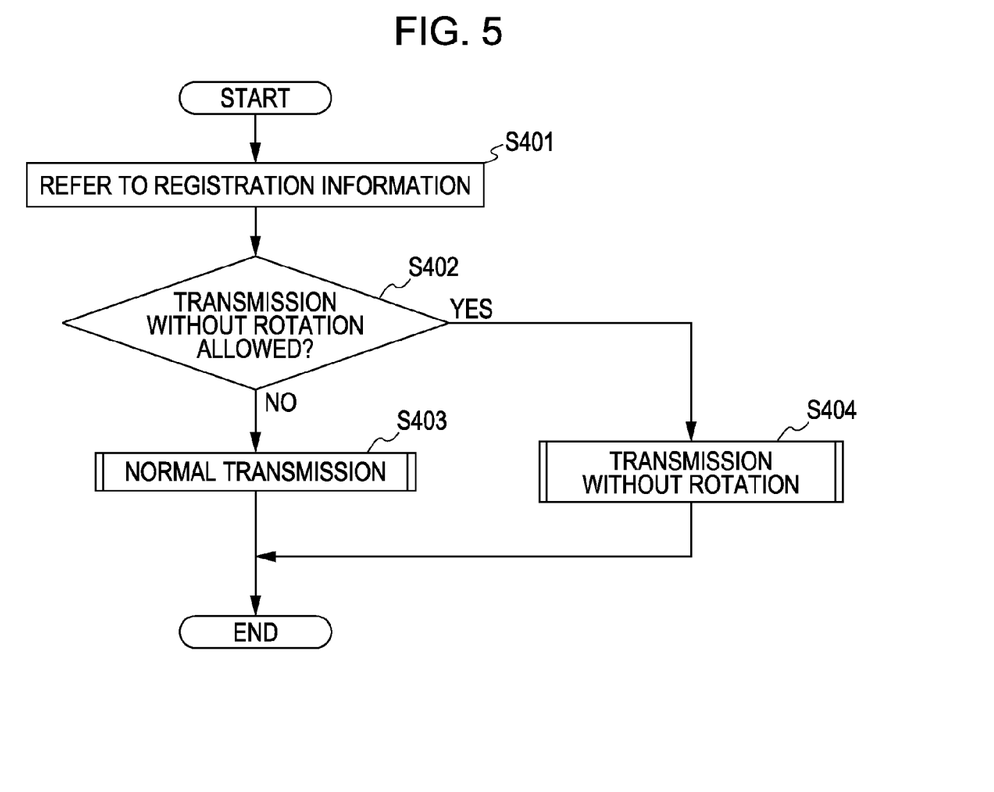
FIG. 5 is a flowchart showing details of a determining process that is executed after a scanner starts a scanning operation.

Next, the determination process executed after the start of the scanning operation by the scanner 117 will be described in detail with reference to FIG. 5. FIG. 5 is a flowchart showing details of the determination process executed after the start of the scanning operation by the scanner 117. The scanning operation is executed when the user sets a transmission destination in a transmission-destination selecting screen displayed on an operation panel of an image processing apparatus and issues an instruction for executing the scanning operation.

First, the transmission-setting manager 1302 refers to registration information selected in step S201 shown in FIG. 2 (step S401). Then, an image-rotation-direction finder 1304 determines whether rotation is to be executed on an image obtained by scanning and stored in the image storage device 105, on the basis of the transmission-without-rotation permission information included in the registration information (step S402). When the transmission-without-rotation permission information indicates that transmission without rotation is allowed, the image-rotation-direction finder 1304 determines that the client PC 116 at the transmission destination is capable of executing image rotation. The process then proceeds to step S404. On the other hand, when the transmission-without-rotation permission information indicates that transmission without rotation is not allowed, the image-rotation-direction finder 1304 determines that the client PC 116 at the transmission destination is not capable of executing image rotation. The process then proceeds to step S403.

In step S403, an image rotator 1305 of the scanner 117 rotates the image obtained by scanning so that the image is oriented upright, and transmits a rotated version of the image to the client PC 116 at the transmission destination (transmission control). For example, when the original document that is scanned is double-sided and is stitched on the upper shorter side, an image on the reverse surface has to be rotated by 180 degrees. As another example, when a sheet is placed on an ADF in a direction for shorter-side feeding (as in the case of a sheet of the extended A4 size), the image on each surface has to be rotated by 90 degrees. As described above, the user can define reading setting via an operating unit depending on document types. Such reading setting can be implemented with existing techniques, so that detailed description thereof will be omitted.

Figure 6:
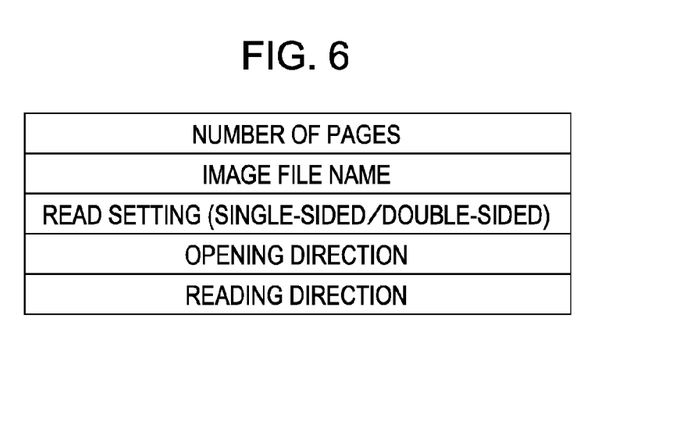
FIG. 6 is a diagram showing an example of image-processing information.

On the other hand, in step S404, the scanner 117 does not rotate the image obtained by scanning, and transmits the image to the client PC 116 at the transmission destination together with the image processing information associated with the image, shown in FIG. 6 (transmission control). More specifically, since a path of the specific folder (hot folder) of the client PC 116 at the transmission destination is specified, the scanner 117 transmits the image together with the image processing information so that the image and the image processing information are stored in the specific folder of the client PC 116.

FIG. 6 is a diagram showing an example of image processing information. As shown in FIG. 6, the image processing information (rotation-direction information) includes original-document reading-direction information, original-document reading-setting information (e.g., specification of single-sided/double-sided reading), and original-document opening direction information.

When an original document is scanned, the image-reading controller 108 obtains reading-direction information, reading-setting information, and opening-direction information of the original document, and includes these pieces of information in image processing information. Furthermore, the image-reading controller 108 stores the image obtained by scanning (image data) and the image processing information in association with each other, for example, in the image storage device 105.

The scanner 117 transmits the image to the client PC 116 with the transmission-without-rotation information indicating "allowed" via the external interface 109. Then, scanner 117 generates an image file and image processing information in a specific folder (hot folder) of the client PC 116 according to transmission setting specified in advance by the user.

When the file has been generated in the hot folder of the client PC 116, the resident-folder detector 1403 of the document processing system 113 detects generation of the file. Then, automatic processing is started according to processing setting registered in the hot-folder-setting manager 1405 by the user in advance.

Figure 7:
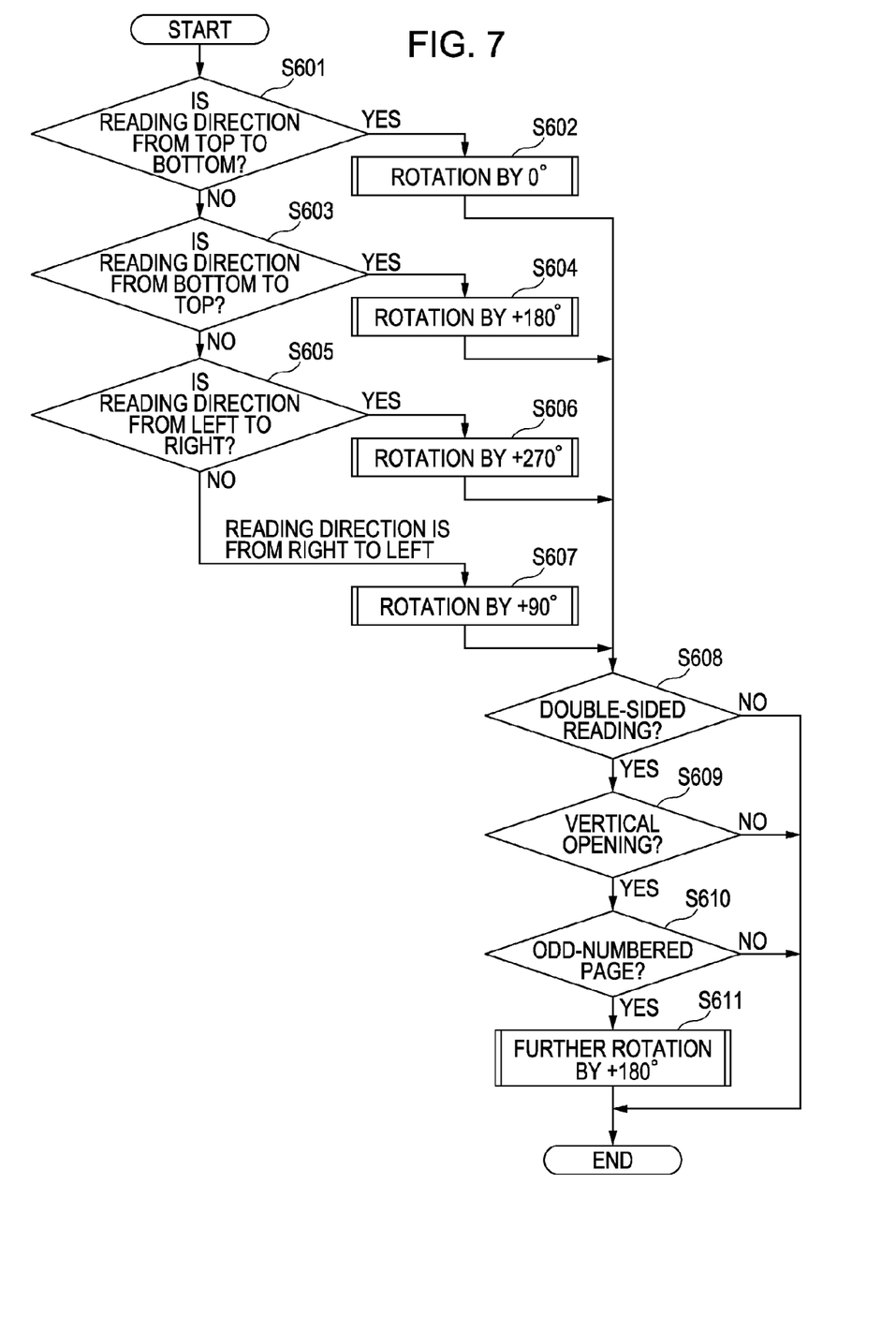
FIG. 7 is a flowchart showing an example of a process in which a document processing system determines a direction of image rotation on the basis of image-processing information attached to an image received by a client PC and rotates the image.

FIG. 7 is a flowchart showing an example of an image-rotation controlling process in which the image-rotation-direction finder 1404 determines a rotation direction on the basis of the image processing information attached to the image received by the client PC 116 and so that the image rotator 1407 rotates the image accordingly.

The image-rotation-direction finder 1404 determines a basic rotation direction on the basis of reading-direction information included in the image processing information (steps S601 to S607). More specifically, in step S601, the image-rotation-direction finder 1404 determines whether the reading direction is a "top-to-bottom" direction on the basis of the reading-direction information included in the image processing information.

When it is determined by the image-rotation-direction finder 1404 that the reading direction is a "top-to-bottom" direction on the basis of the reading-direction information included in the image processing information, the process proceeds to step S602. In step S602, the image rotator 1407 chooses a rotation direction of 0 degrees. The process then proceeds to step S608. On the other hand, when it is determined by the image-rotation-direction finder 1404 that the reading direction is not a "top-to-bottom" direction on the basis of the reading-direction information included in the image processing information, the process proceeds to step S603. In step S603, the image-rotation-direction finder 1404 determines whether the reading direction is a "bottom-to-top" direction.

When it is determined by the image-rotation-direction finder 1404 that the reading direction is a "bottom-to-top" direction on the basis of the reading-direction information included in the image processing information, the process proceeds to step S604. In step S604, the image rotator 1407 chooses a rotation direction of +180 degrees. The process then proceeds to step S608. On the other hand, when it is determined by the image-rotation-direction finder 1404 that the reading direction is not a "bottom-to-top" direction on the basis of the reading-direction information included in the image processing information, the process proceeds to step S605. In step S605, the image-rotation-direction finder 1404 determines whether the reading direction is a "left-to-right" direction.

When it is determined by the image-rotation-direction finder 1404 that the reading direction is a "left-to-right" direction on the basis of the reading-direction information included in the image processing information, the process proceeds to step S606. In step S606, the image rotator 1407 chooses a rotation direction of +270 degrees. The process then proceeds to step S608. On the other hand, when it is determined by the image-rotation-direction finder 1404 that the reading direction is not a "left-to-right" direction on the basis of the reading-direction information included in the image processing information, the process proceeds to step S607. In step S607, the image rotator 1407 chooses a rotation direction of +90 degrees.

The reading direction is unambiguously determined when the image is read by the image reader 102, depending on the physical mechanism of the image reader 102, the orientation of placement of the original document, whether the original document is fed from the automatic document feeder (ADF) 101 or placed and read on an image reader plate, and so forth.

Furthermore, when double-sided reading and vertical opening are specified, when the image is an odd-numbered image, the image-rotation-direction finder 1404 determines that the image has to be rotated further by +180 degrees (steps S608 to S611). More specifically, in step S1404, the image-rotation-direction finder 1404 determines whether double-sided reading is specified on the basis of the single-sided/double-sided specification information included in the image processing information.

When it is determined by the image-rotation-direction finder 1404 that double-sided reading is specified on the basis of the single-sided/double-sided specification information included in the image processing information, the process proceeds to step S609. On the other hand, when it is determined that double-sided reading is not specified, the process shown in FIG. 7 is exited.

In step S609, the image-rotation-direction finder 1404 determines whether the original document has a vertical opening direction on the basis of opening-direction information included in the image processing information. When it is determined by the image-rotation-direction finder 1404 that the original document has a vertical opening direction on the basis of the opening-direction information included in the image processing information, the process proceeds to step S610. On the other hand, when it is determined that the original document does not have a vertical opening direction, the process shown in FIG. 7 is exited.

In step S610, the image-rotation-direction finder 1404 determines whether the current page is an odd-numbered page on the basis of page-number information included in the image processing information. When it is determined by the image-rotation-direction finder 1404 that the current page is an odd-numbered page on the basis of page-number information included in the image processing information, the process proceeds to step S611. On the other hand, when it is determined that the current page is not an odd-numbered page, the process shown in FIG. 7 is exited.

In step S611, the image rotator 1407 changes the rotation direction by +180 degrees.

After the process shown in FIG. 7 is exited, a hot-folder manager 1401 continues the automatic processing set in the hot-folder-setting manager 1405. Upon finishing the automatic processing, the hot-folder manager 1401 activates a document editing application 1402, and passes the image rotated as needed to the document editing application 1402 for further processing.

Alternatively, the image rotator 1407 may be provided within the document editing application 1402 so that image rotation is executed by the document editing application 1402 instead of the hot-folder manager 1401.

Figure 8:
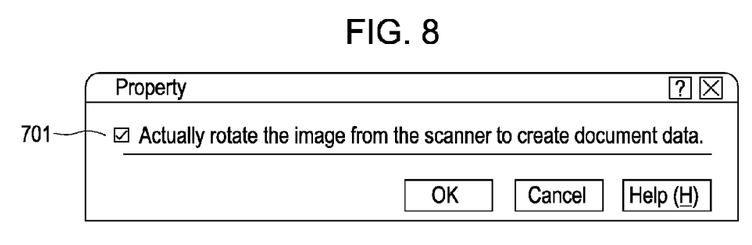
FIG. 8 is an illustration of an example of a UI for specifying an operation that is executed when a received image is converted into electronic document data.

More specifically, the hot-folder manager 1401 can execute two types of operations when converting a received image into electronic document data, namely, either rotating the image itself, or specifying a direction of rotation in detailed format information instead of rotating the image itself. The hot-folder manager 1401 executes one of these two types of operations according to setting specified in a UI 701 shown in FIG. 8. FIG. 8 is an illustration showing an example of a UI for specifying an operation that is executed when converting a received image into electronic document data.

When the image itself is rotated, the hot-folder manager 1401 rotates the image by an angle determined by the process shown in FIG. 7, and saves the image as a page in an electronic document file 115. In this case, information indicating 0 degrees, i.e., no rotation, is saved in the electronic document file 115 as a rotation angle for the page.

On the other hand, when the image itself is not rotated, the hot-folder manager 1401 saves the image as it is as a page in the electronic document file 115. In this case, information indicating the rotation angle determined by the process shown in FIG. 7 is saved as a rotation angle for the page.

Alternatively, the image-rotation-direction finder 1404 may be provided within the image-reading controller 108 so that the rotation direction is determined by the image-reading controller 108. Furthermore, it is possible to record individual rotation directions determined for all the images as image processing information and to transmit image processing information including the rotation directions to the client PC 116.

The electronic document file 115 is a device-independent format that allows representing a page-based document with detailed formatting, such as PDF or SVG.

The orders of the steps in the flowcharts described above may be rearranged unless inconsistencies arise in relation to preceding and succeeding steps.

Other Embodiments

The processing functions of the scanner 117 and/or the client PC 116 in the embodiment described above are typically implemented by a central processing unit (CPU) reading programs for executing the processing functions from a memory and executing the program. However, without limitation, the processing functions may be entirely or partially implemented in special hardware. The memory may be implemented by a non-volatile memory, a read-only storage medium such as a CD-ROM, a volatile memory, or a computer-readable/writable storage medium.

Furthermore, it is possible to record the programs for implementing the processing functions of the scanner 117 and or the client PC 116 on a computer-readable storage medium, so that a computer system can read and execute the programs recorded on the storage medium to execute processing. The "computer system" herein includes software, such as an operating system, and hardware, such as peripheral devices.

According to the embodiments described above, the scanner 117 can determine whether the client PC 116 selected by the user as a transmission destination of an image is capable of executing image rotation. Furthermore, the scanner 117 can rotate the image or refrain from rotating the image according to the result of the determination, and transmit the image or a rotated version of the image to the client PC 116.

That is, the user is allowed to perform operations without considering whether the apparatus at the transmission destination of the image is capable of executing image rotation.

Furthermore, the scanner 117 can attach image processing information to the image when transmitting the image to the client PC 116 without rotating the image, so that the client PC 116 having the capability of executing image rotation can automatically rotate the image. That is, image rotation can be executed quickly by the client PC 116 having a high processing ability.

Furthermore, the client PC 116 can select whether to create an electronic document by rotating a received image according to image processing information or to create an electronic document by saving the image together with the image processing information without rotating the image. Thus, even when the image is not oriented upright, unnecessary image rotation can be refrained.

Accordingly, it is possible to achieve both quickly executing processing for transmission of an image read by an image forming apparatus to a recipient apparatus and reduction of the load of user operations at the recipient apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-096903 filed Mar. 31, 2006 and No. 2006-328507 filed Dec. 5, 2006, which are hereby incorporated by reference herein in their entirety.

What is claimed is:

1. An information processing apparatus for having a storage device communicating with an image processing apparatus that is capable of transmitting an image of a sheet read by an image reader, the information processing apparatus comprising:
    a storing unit configured to store a document editing application;
    a receiving unit configured to receive an image and image processing information on reading processing of the sheet from the image processing apparatus;
    a hot folder manager configured to detect that the image and the image processing information are generated in a hot folder on which a processing setting is registered, wherein the hot folder manager decides a rotation angle of the image based on the image processing information received by the receiving unit and the processing setting when the image and the image processing information are detected, and activates the document editing application when the rotation angle is decided; and
    a passing unit configured to pass the image rotated by the rotation angle to the activated document editing application,
    wherein the storing unit, receiving unit, hot folder manager, and the passing unit are performed by a CPU.

2. The information processing apparatus according to claim 1, further comprising:
    a specifying unit configured to specify rotation of an image;
    a storing control unit configured to store an image rotated by the rotation angle and information indicating that the rotation angle is zero degree in a case where the specifying unit specifies the rotation of the image, and to store an image before being rotated and information indicating that the rotation angle decided by the deciding unit in a case where the specifying unit does not specify the rotation of the image.

3. A method for an image processing apparatus that is capable of transmitting an image of a sheet read by an image reader, the method comprising:
    storing a document editing application;
    receiving an image and image processing information on reading processing of the sheet from the image processing apparatus;
    detecting, by a hot folder manager, that the image and the image processing information are generated in a hot folder on which a processing setting is registered;
    deciding, by the hot folder manager, a rotation angle of the image based on the image processing information received and the processing setting when the image and the image processing information are detected;
    activating, by the hot folder manager, the document editing application when the rotation angle is decided; and
    passing the image rotated by the rotation angle to the document editing application.

4. A method for an image processing apparatus according to claim 3, further comprising:
    specifying rotation of an image;
    storing an image rotated by the rotation angle and information indicating that the rotation angle is zero degree in a case where specifying the rotation of the image, and to store an image before being rotated and information indicating that the rotation angle decided in a case where there is no specifying the rotation of the image.

5. A non-transitory computer-readable medium storing instructions which, when executed by an information processing apparatus, causes the information processing apparatus to perform operations comprising:

storing a document editing application;

receiving an image and image processing information on reading processing of the sheet from the image processing apparatus;

detecting, by a hot folder manager, that the image and the image processing information are generated in a hot folder on which a processing setting is registered;

deciding, by the hot folder manager, a rotation angle of the image based on the image processing information received and the processing setting when the image and the image processing information are detected;

activating, by the hot folder manager, the document editing application when the rotation angle is decided; and passing the image rotated by the rotation angle to the document editing application.

6. A non-transitory computer-readable medium according to claim 5, further comprising:

specifying rotation of an image;

storing an image rotated by the rotation angle and information indicating that the rotation angle is zero degree in a case where specifying the rotation of the image, and to store an image before being rotated and information indicating that the rotation angle decided in a case where there is no specifying the rotation of the image.

* * * * *